United States Patent
Zhao et al.

(10) Patent No.: US 10,764,007 B2
(45) Date of Patent: Sep. 1, 2020

(54) METHOD AND APPARATUS FOR TRANSMITTING UPLINK SOUNDING REFERENCE SIGNAL

(71) Applicant: Samsung Electronics Co., Ltd., Gyeonggi-do (KR)

(72) Inventors: Zheng Zhao, Beijing (CN); Yingyang Li, Beijing (CN); Jingxing Fu, Beijing (CN)

(73) Assignee: Samsung Electronics Co., Ltd (KR)

( * ) Notice: Subject to any disclaimer, the term of this patent is extended or adjusted under 35 U.S.C. 154(b) by 155 days.

(21) Appl. No.: 15/306,320

(22) PCT Filed: Apr. 23, 2015

(86) PCT No.: PCT/KR2015/004059
§ 371 (c)(1),
(2) Date: Oct. 24, 2016

(87) PCT Pub. No.: WO2015/163709
PCT Pub. Date: Oct. 29, 2015

(65) Prior Publication Data
US 2017/0048039 A1  Feb. 16, 2017

(30) Foreign Application Priority Data
Apr. 23, 2014 (CN) .......................... 2014 1 0164462

(51) Int. Cl.
*H04L 5/00* (2006.01)
*H04L 25/02* (2006.01)
*H04L 5/14* (2006.01)

(52) U.S. Cl.
CPC .......... *H04L 5/0048* (2013.01); *H04L 5/0094* (2013.01); *H04L 5/14* (2013.01); *H04L 25/0226* (2013.01); *H04L 25/0228* (2013.01)

(58) Field of Classification Search
CPC . H04L 5/0048; H04L 5/0094; H04L 25/0226; H04L 5/14; H04L 25/0228
See application file for complete search history.

(56) References Cited

U.S. PATENT DOCUMENTS

| | | | | |
|---|---|---|---|---|
| 2010/0118720 | A1* | 5/2010 | Gauvreau | H04W 72/048 370/252 |
| 2011/0098054 | A1* | 4/2011 | Gorokhov | H04B 7/024 455/452.1 |

(Continued)

FOREIGN PATENT DOCUMENTS

| CN | 102934382 | 2/2013 |
|---|---|---|
| JP | 2013-530644 | 7/2013 |

(Continued)

OTHER PUBLICATIONS

PCT/ISA/210 Search Report issued on PCT/KR2015/004059 (pp. 3), dated Apr. 23, 2014.

(Continued)

*Primary Examiner* — Peter P Chau
(74) *Attorney, Agent, or Firm* — The Farrell Law Firm, P.C.

(57) ABSTRACT

Various embodiments of the present disclosure describe a terminal and a base station. Various embodiments of the present disclosure describe how to transmit the SRS on an FDD downlink carrier and effectively configure and transmit the FDD downlink carrier SRS, so that the FDD system has the channel reciprocity and is more suitable for a large-scale multi-antenna system. Various embodiments of the present disclosure describe an SRS transmission method and device when an uplink carrier of the FDD system can transmit an uplink signal and a downlink signal.

16 Claims, 5 Drawing Sheets

(56) References Cited

U.S. PATENT DOCUMENTS

| | | |
|---|---|---|
| 2011/0268028 A1 | 11/2011 | Stern-Berkowitz et al. |
| 2012/0135773 A1 | 5/2012 | Shen et al. |
| 2013/0078913 A1* | 3/2013 | Lee .................. H04L 5/0007 455/39 |
| 2013/0121279 A1 | 5/2013 | Noh et al. |
| 2013/0148535 A1* | 6/2013 | Baghel .............. H04L 1/0026 370/252 |
| 2013/0242911 A1 | 9/2013 | Heo et al. |
| 2013/0250847 A1* | 9/2013 | Lee .................. H04L 5/0051 370/315 |
| 2014/0050182 A1* | 2/2014 | Iwai ................. H04W 52/325 370/329 |
| 2014/0112260 A1* | 4/2014 | Sorrentino ......... H04W 52/325 370/329 |
| 2014/0376482 A1* | 12/2014 | Kim .................. H04B 7/024 370/329 |
| 2015/0163036 A1* | 6/2015 | Thomas ............. H04L 5/0044 370/281 |
| 2015/0304994 A1 | 10/2015 | Kim |
| 2016/0050057 A1* | 2/2016 | Kim .................. H04J 11/0053 370/329 |
| 2016/0278031 A1* | 9/2016 | Sorrentino ......... H04W 56/001 |
| 2017/0347322 A1 | 11/2017 | Lee et al. |

FOREIGN PATENT DOCUMENTS

| | | |
|---|---|---|
| WO | WO 2013/115515 | 8/2013 |
| WO | WO 2014/054887 | 4/2014 |

OTHER PUBLICATIONS

PCT/ISA/237 Written Opinion issued on PCT/KR2015/004059 (pp. 8), dated Apr. 23, 2014.
RP-140062, Feb. 25, 2014, 3GPP TSG RAN Meeting #63, Fukuoka, Japan, Mar. 3-6, 2014.
ZTE, "Some Remaining Issues about Uplink Power Control", R1-135364, 3GPP TSG RAN WG1 Meeting #75, Nov. 11-15, 2013, 7 pages.
European Search Report dated Dec. 13, 2017 issued in counterpart application No. 15782260.2-1875, 10 pages.
Japanese Office Action dated Dec. 3, 2018 issued in counterpart application No. 2016-564153, 10 pages.
Chinese Office Action dated Feb. 3, 2019 issued in counterpart application No. 201410164462.7, 13 pages.

* cited by examiner

METHOD AND APPARATUS FOR TRANSMITTING UPLINK SOUNDING REFERENCE SIGNAL

PRIORITY

This application is a National Phase Entry of PCT International Application No. PCT/KR2015/004059, which was filed on Apr. 23, 2015, and claims priority to Chinese Patent Application No. 201410164462.7, which was filed on Apr. 23, 2014, the contents of each of which are incorporated herein by reference.

FIELD OF THE INVENTION

The present disclosure relates to radio communication technologies, and particularly, to a method and device for transmitting uplink sounding reference signal (SRS).

BACKGROUND OF THE INVENTION

An Frequency Division Duplex (FDD) mode and a Time Division Duplex (TDD) mode are widely used in radio communication systems. The FDD mode refers to a mode in which uplink and downlink use different frequency resources for communication. The TDD mode refers to a mode in which the uplink and downlink share the same frequency resources and the uplink communication and downlink communication are respectively performed through time domain division.

For example, a Long Term Evolution (LTE) system corresponding to an Evolved Universal Terrestrial Radio Access (E-UTRA) protocol developed by the 3rd Generation Partnership Project (3GPP) supports the FDD mode and the TDD mode, and a radio frame structure includes an FDD frame structure and a TDD frame structure.

FIG. 1 is a diagram illustrating the frame structure in the FDD mode. A 10 ms uplink radio frame and a 10 ms downlink radio frame are respectively composed of twenty 0.5 ms time slots which are numbered from 0 to 19. Time slots 2i and 2i+1 construct a subframe i of which the length is 1 ms. The uplink and the downlink are communicated at different frequency resources. FIG. 2 is a diagram illustrating the frame structure in the TDD mode. A 10 ms radio frame is composed of two half frames and the length of each half frame is 5 ms. One half frame includes five 1 ms subframes. A subframe i includes two time slots 2i and 2i+1 and the length of each time slot is 0.5 ms. The uplink and the downlink share the same frequency resources and the uplink communication or the downlink communication are performed at different subframes of the radio frame.

In the above two frame structures, for a Normal Cyclic Prefix (Normal CP), a time slot includes seven symbols and the length of each of the seven symbols is 66.7 us. In this case, the length of the CP of the first symbol is 5.21 us. The length of the CP of each of the remaining six symbols is 4.69 us. For an Extended Cyclic Prefix (Extended CP), a time slot includes six symbols and the length of each of the six symbols is 16.67 us.

Uplink/downlink configurations supported by the TDD mode are shown in Table 1. For each subframe in a radio frame, "D" represents a subframe dedicated to downlink transmission, "U" represents a subframe dedicated to uplink transmission, and "S" represents a special subframe of three fields including Downlink Pilot Time Slot (DwPTS), Guard Period (GP), and Uplink Pilot Time Slot (UpPTS). The length of each of DwPTS and UpPTS is shown in Table 2. In this case, the total length of DwPTS, GP, and UpPTS is 30720 T=1 ms, in which $T_s$ is a time unit and is defined as 1/(15000*2048) sec. Each subframe i is represented by two time slots 2i and 2i+1 and the length of each time slot is $T_{slot}$, =15360·$T_s$, =0.5 ms.

The LTE TDD supports a 5 ms downlink-to-uplink switch-point periodicity and a 10 ms downlink-to-uplink switch-point periodicity. If the switch-point periodicity from the downlink to the uplink is 5 ms, the special subframe may exist in two half frames. If the switch-point periodicity from the downlink to the uplink is 10 ms, the special subframe only exists in the first half frame. Subframe 0, subframe 5, and DwPTS are always used for downlink transmission. UpPTS and a subframe following the special subframe are dedicated to uplink transmission. The configurations as shown in Table 1 may flexibly support different asymmetric services. The special subframe configurations as shown in Table 2 support GP with different lengths and different cell radiuses and avoid strong interference between base stations in a TDD system.

TABLE 1

| | TDD uplink-downlink configurations | | | | | | | | | | |
|---|---|---|---|---|---|---|---|---|---|---|---|
| Uplink-Downlink configurations | Downlink-to-uplink switch-point periodicity | \multicolumn{10}{c}{subframe number} | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Special subframe configurations (length of DwPTS/GP/UpPTS)

| | Normal CP, downlink | | | Extended CP, downlink | | |
| | | UpPTS | | | UpPTS | |
| Special subframe configurations | DwPTS | Normal CP, uplink | Extended CP, uplink | DwPTS | Normal CP, uplink | Extended CP, uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Both the TDD mode and the FDD mode have its own advantages and disadvantages. For example, the uplink/downlink configurations of the TDD system as shown in Table 1 are configurable and may better support the asymmetric services and improve usage efficiency of frequency spectrums, while at a pair of FDD frequency spectrums, uplink frequency spectrum resources is wasted when there are many downlink services. However, the FDD uplink and downlink resources are always available due to the paired FDD frequency spectrums, so that a terminal may timely return uplink control signaling, such as an Acknowledge/Non-Acknowledge (ACK/NACK) message of a Hybrid Automatic Retransmission Request (HARQ) and Channel state information (CSI), and therefore feedback delay of an air interface can be reduced and the scheduling efficiency can be improved.

In addition, an uplink channel and a downlink channel of the TDD system use the same carrier and the uplink and downlink radio channels are almost the same. As such, after a base station receives an uplink signal and obtains uplink channel quality measurement or estimation, a state of the downlink channel is obtained, such as the speed of fading, adjacent areas interference, etc. This feature is called channel reciprocity. Since an uplink link and a downlink link in the FDD use different frequency bands, an uplink radio channel and a downlink radio channel are different. In order to obtain downlink channel information, a base station may send a downlink reference signal (RS). A terminal estimates downlink channel quality or channel fading according to the reference signal and returns estimated information. The base station performs operations like downlink scheduling, resource allocation, pre-coding based on the returned downlink channel information. Because the TDD system achieves the channel reciprocity, a multi-antenna system can be better used.

As can be seen that in a future radio communication system, the advantages of the TDD system may be integrated into the FDD system, so that the features of the TDD including the channel reciprocity and supporting the asymmetric services can be used by the FDD system. In this way, the usage efficient of the frequency spectrums and network performance can be greatly improved. In the FDD system integrating the advantages of the TDD, an uplink (or downlink) work carrier of the FDD system transmits uplink data and downlink data in a Time Division Multiplexing (TDM) manner. Various embodiments of the present disclosure describe transmission of a sounding reference signal in such system.

SUMMARY OF THE INVENTION

The technical problem to be solved by various embodiments of the present disclosure is transmission and reception of the SRS under an FDD mode in a conventional radio communication system.

Various embodiments of the present disclosure describe a method for transmitting an uplink sounding reference signal (SRS), comprising:

obtaining, by a terminal, configuration and triggering information of an SRS;

determining a carrier and a subframe where transmission of the SRS is located based on the SRS configuration and triggering information;

wherein the carrier where the transmission of the SRS is located is a downlink carrier in an FDD system or an uplink carrier of flexible duplex;

obtaining, by the terminal, SRS power control information and determining an SRS power value; and transmitting, by the terminal, the SRS at the determined carrier and subframe with the determined SRS power value for a base station to estimate channel information.

According to various embodiments of the present disclosure, when an FDD uplink carrier and an FDD downlink carrier construct different serving cells, the terminal obtains SRS configuration and triggering information corresponding to each serving cell.

According to various embodiments of the present disclosure, the operation of determining the carrier where the transmission of the SRS is located comprises:

carrying a carrier direction indicator in the SRS configuration and triggering information;

wherein the carrier direction indicator indicates the carrier where the transmission of the SRS is located is an uplink carrier or a downlink carrier;

or, when an FDD uplink carrier is the uplink carrier of the flexible duplex, determining a carrier where higher layer signaling carrying the configuration and triggering information is located as the carrier where the transmission of the SRS is located;

or, preconfiguring a subframe corresponding to a downlink carrier and a subframe corresponding to an uplink carrier, determining the subframe where the higher layer signaling carrying the configuration and triggering information is located, and determining a carrier corresponding to the subframe as the carrier where the transmission of the SRS is located.

According to various embodiments of the present disclosure, when the transmission of the SRS is triggered through a triggering type 1, the operation of determining the carrier where the transmission of the SRS is located comprises:

determining a carrier where the data scheduled by physical layer signaling triggering the SRS transmission is located as the carrier where the SRS transmission is located;

or, determining a carrier where the physical layer signaling triggering the SRS transmission is located as the carrier where the SRS transmission is located.

According to various embodiments of the present disclosure, when an FDD uplink carrier and an FDD downlink carrier within a same serving cell share the same configuration and triggering information, the operation of determining the carrier and the subframe where the SRS transmission is located comprises:

when the uplink carrier of the serving cell supports uplink transmission only, determining the carrier and the subframe where the SRS transmission is located in accordance with an FDD mode; when the uplink carrier of the serving cell supports the uplink transmission and downlink transmission, determining the carrier and the subframe where the SRS transmission is located in accordance with a TDD mode;

or, determining the carrier and the subframe where the SRS transmission is located in accordance with the FDD mode;

or, determining the carrier and the subframe where the SRS transmission is located in accordance with the TDD mode.

According to various embodiments of the present disclosure, when an FDD uplink carrier and an FDD downlink carrier within a same serving cell share the same configuration and triggering information, the method further comprises:

when the terminal does not determine whether the FDD uplink carrier of the serving cell supports the downlink transmission, ignoring, by the terminal, the obtained configuration and triggering information without performing the SRS transmission.

According to various embodiments of the present disclosure, when an FDD uplink carrier and an FDD downlink carrier within a same serving cell use different configuration and triggering information, the operation of determining the carrier and the subframe where the SRS transmission is located comprises:

receiving, from the base station, higher layer signaling corresponding to the uplink carrier or the downlink carrier and indicating a configuration and triggering mode; and determining the carrier and the subframe where the SRS transmission is located in accordance with the configuration and triggering mode;

wherein the configuration and triggering mode is a TDD mode or an FDD mode.

According to various embodiments of the present disclosure, when an FDD uplink carrier of a serving cell where a UE is located supports downlink transmission and the terminal does not determine actual subframe uplink/downlink distribution of the FDD uplink carrier, the method further comprises:

ignoring, by the terminal, SRS configuration of which a triggering type is 0 without performing the SRS transmission;

or, according to downlink Hybrid Automatic Retransmission Request (HARQ) reference configuration, when a PUSCH is not scheduled on a subframe which is not used as an uplink subframe and UpPTS, ignoring, by the terminal, the SRS configuration of which the triggering type is 0 on the subframe without performing the SRS transmission.

According to various embodiments of the present disclosure, when the uplink carrier of the flexible duplex configures a subframe transmission direction according to an 8 ms periodicity, for a cell-specific SRS, the operation of determining the subframe where the transmission of the SRS is located comprises:

determining a sub frame satisfying $[(10 n_f \bmod 40) + \lfloor n_s/2 \rfloor] \bmod T_{SFC} \in \Delta_{SFC}$ as the subframe where the SRS transmission is located;

wherein $n_f$ is a serial number of a radio frame, $n_s$ is a serial number of a time slot, $T_{SFC}$ and $\Delta_{SFC}$ respectively are a cell-specific SRS subframe periodicity and a cell-specific SRS subframe absolute value in the configuration and triggering information.

According to various embodiments of the present disclosure, when the uplink carrier of the flexible duplex configures a subframe transmission direction according to an 8 ms periodicity, for an SRS triggered by a triggering type 0, the operation of determining the subframe where the transmission of the SRS is located comprises:

determining a subframe satisfying $[(40(n_f \bmod 4) + k_{srs} - T_{offset}] \bmod T_{SRS} = 0$ as the subframe where the SRS transmission is located;

wherein $n_f$ is a serial number of a radio frame, $k_{srs}$ is a serial number of a symbol transmitting the SRS in a superframe, $T_{SRS}$ and $T_{offset}$ respectively are a subframe periodicity and a subframe offset of a UE-specific SRS of which the triggering type is 0.

According to various embodiments of the present disclosure, when the uplink carrier of the flexible duplex configures a subframe transmission direction according to an 8 ms periodicity, for an SRS triggered by a triggering type 1, the operation of determining the subframe where the transmission of the SRS is located comprises:

determining a subframe satisfying $[(40(n_f \bmod 4) + k_{srs} - T_{offset,1}] \bmod T_{SRS,1} = 0$ as the subframe where the SRS transmission is located;

wherein $n_f$ is a serial number of a radio frame, $k_{srs}$ is a serial number of a symbol transmitting the SRS in a superframe, $T_{SRS,1}$ and $T_{offset,1}$ respectively are a subframe periodicity and a subframe offset of a UE-specific SRS of which the triggering type is 1.

According to various embodiments of the present disclosure, $k_{srs}$ is an SRS symbol index in all of uplink subframes and special subframes in all of uplink/downlink configurations of the uplink carrier of the flexible duplex;

or, $k_{srs}$ is a subframe index in the radio superframe;

or, $k_{srs}$ is the subframe index in the radio superframe and a subframe prior to all of UpPTS does not include an SRS symbol;

wherein the radio superframe is a frame structure consisting of four radio frames.

According to various embodiments of the present disclosure, the operation of the terminal obtaining the SRS power control information comprises:

determining a power control adjustment value of the SRS on the downlink carrier based on a received TPC indication corresponding to the downlink carrier in DCI format 3/3A;

wherein the operation of receiving the TPC indication corresponding to the downlink carrier in the DCI format 3/3A comprises:

determining, by the UE, a TPC serial number of each uplink carrier and downlink carrier according to higher layer signaling, and reading the TPC corresponding to a TPC serial number of the downlink carrier from the DCI format 3/3A;

or, pre-designating a subframe carrying the DCI format 3/3A corresponding to the downlink carrier and a subframe carrying the DCI format 3/3A corresponding to the uplink carrier, and determining whether the TPC indication in the DCI format 3/3A corresponds to the uplink carrier or the downlink carrier according to a subframe where the received DCI format 3/3A is located.

According to various embodiments of the present disclosure, after determining the SRS power value and before performing the SRS transmission, the method further comprises:

when a total SRS transmission power of the terminal within a symbol on subframe i is greater than $\hat{P}_{CMAX}(i)$, discarding the SRS transmission on the downlink carrier or the uplink carrier until the total SRS transmission power is not greater than $\hat{P}_{CMAX}(i)$;

wherein $\hat{P}_{CMAX}(i)$ is a linear value of $P_{CMAX}$ in subframe i and $P_{CMAX}$ is defined in 3GPP TS36.101.

According to various embodiments of the present disclosure, when the determined downlink carrier where the SRS transmission is located supports a lower version terminal, the method further comprises:

the terminal obtaining the configuration and triggering information not performing the SRS transmission on a subframe transmitting SIB1, a paging signal, or a MBSFN and/or on a subframe transmitting a SPS signal of the lower version terminal;

wherein the lower version terminal is a terminal which does not support the SRS transmission on an FDD downlink carrier.

According to various embodiments of the present disclosure, the terminal receives higher layer signaling transmitted by the base station, wherein the higher layer signaling includes a subframe indication indicating that the SRS transmission is allowed within a configured periodicity.

Various embodiments of the present disclosure describe a method for receiving an uplink sounding reference signal (SRS) and estimating a channel, comprising:

receiving, by a base station, an SRS transmitted by a terminal on a downlink carrier or an uplink carrier of flexible duplex; and estimating channel information based on the SRS and configuring the channel information as channel information of a downlink channel on the carrier carrying the SRS.

According to various embodiments of the present disclosure, the method further comprising:

receiving, by the base station, a Channel Quality Indicator (CQI) measured by the terminal based on a downlink reference symbol and reported by the terminal; and combining the CQI with the channel information estimated based on the SRS to construct complete downlink channel information.

According to various embodiments of the present disclosure, the method further comprising:

receiving, by the base station, a second downlink channel information between part of antennas of the terminal and a transmitting antenna of the base station that is measured by the terminal based on a downlink reference symbol and reported by the terminal; and combining the second downlink channel information with the channel information estimated based on the SRS to construct complete downlink channel information;

wherein the part of the antennas of the terminal is a receiving antenna at the terminal that is not used as a transmitting antenna.

Various embodiments of the present disclosure describe a terminal device, comprising:

a configuration module, configured to obtain configuration and triggering information of a sounding reference signal (SRS), determine a carrier and a subframe where transmission of the SRS is located according to the SRS configuration and triggering information, obtain SRS power control information and determine an SRS power value; wherein the carrier where the transmission of the SRS is located is a downlink carrier in an FDD system or an uplink carrier of flexible duplex; and an SRS transmission module, configured to transmit the SRS at the determined carrier, and subframe with the determined SRS power value for a base station to estimate channel information.

Various embodiments of the present disclosure describe a base station device, comprising:

a sounding reference signal (SRS) detection module, configured to detect an SRS transmitted by a terminal at a downlink carrier or an uplink carrier supporting flexible duplex; and a channel estimation module, configured to estimate channel information according to the SRS detected by the SRS detection module and configure an estimation result as channel information of a downlink channel corresponding to an uplink channel carrying the SRS.

As can be seen from the above technical scheme, various embodiments of the present disclosure describe how to transmit the SRS on an FDD downlink carrier and an uplink carrier of the flexible duplex. According the embodiments of the present disclosure, the SRS transmission on a corresponding carrier is effectively configured and transmitted, so that the FDD system has the channel reciprocity and is more suitable for a large-scale multi-antenna system. Various embodiments of the present disclosure describe an SRS transmission method and device when an uplink carrier of the FDD system can transmit an uplink signal and a downlink signal.

BRIEF DESCRIPTION OF ACCOMPANYING DRAWINGS

DETAILED DESCRIPTION OF THE INVENTION

Figure 1:
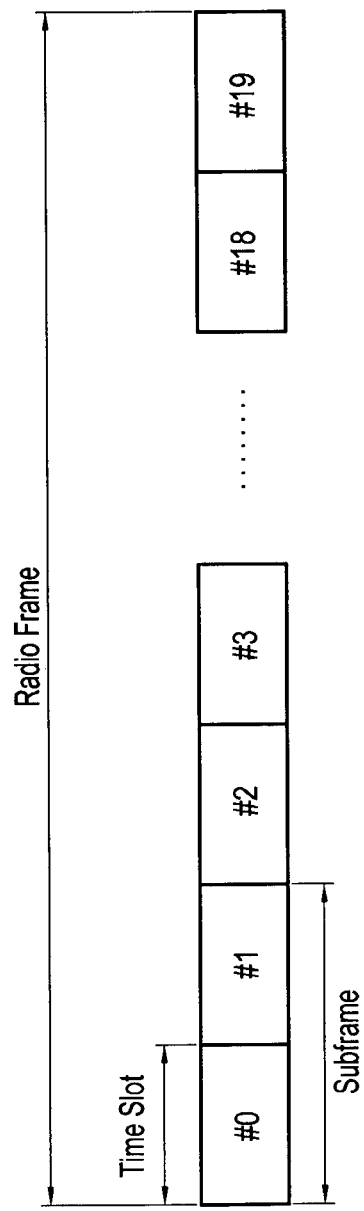
FIG. 1 is a diagram illustrating a frame structure in an FDD mode.
Figure 2:
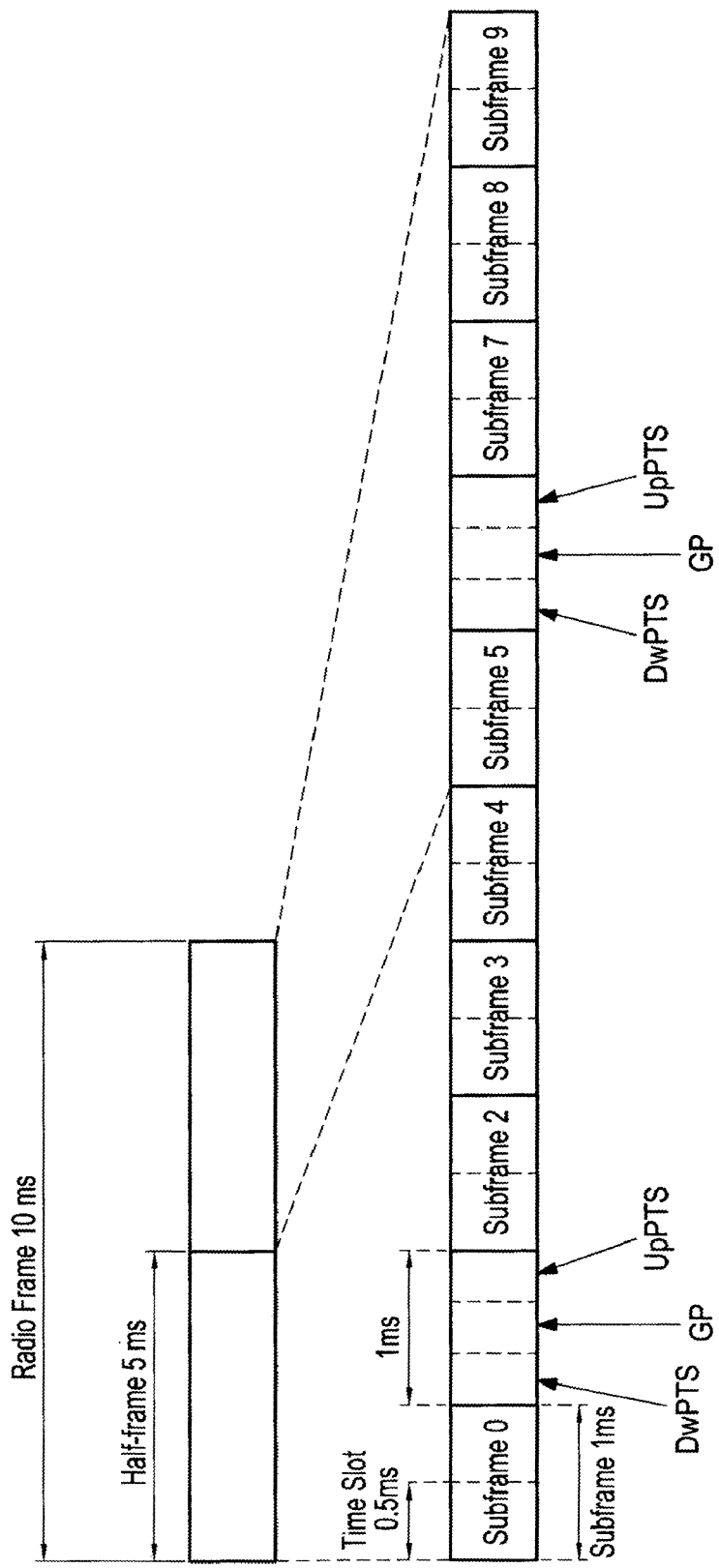
FIG. 2 is a diagram illustrating a frame structure in a TDD mode.

Hereinafter, the present disclosure is described in further detail with, reference to the accompanying drawings and examples to make the objective, technical scheme and merits therein clearer.

Hereinafter, a carrier used for transmitting downlink data in a current paired FDD frequency bands is called an FDD downlink carrier and a carrier used for transmitting uplink data in the current paired FDD frequency bands is called an FDD uplink carrier. In order to solve the issue of the prior art, various embodiments of the present disclosure describe a method for transmitting an uplink sounding reference signal, a method for transmitting an SRS at an FDD downlink carrier, and a method for transmitting an SRS when an FDD uplink carrier may transmit an uplink signal and a downlink signal. When the methods are used, a base station may estimate uplink channel information based on a received SRS and obtain downlink channel information using the reciprocity between the uplink channel and the downlink channel. Compared with a terminal directly performing the downlink channel estimation, the methods can save load of a downlink reference symbol and reduce the air interface delay of obtaining the downlink channel information, so that the FDD mode is more suitable for a large-scale multi-antenna system. Specifically, at a downlink carrier of the FDD system, the method described in various embodiments of the present disclosure may be used to determine a downlink subframe used for transmitting an SRS and an uplink SRS is transmitted at a designated symbol of the downlink subframe. In this case, the designated symbol may be a symbol predetermined/preconfigured by standards. When an uplink carrier of the FDD system may transmit an uplink signal and a downlink signal (this uplink carrier may be referred to as an uplink carrier of flexible duplex), an FDD uplink/downlink ratio is changeable, which can batter support the asymmetric uplink/downlink services. Various embodiments of the present disclosure also describe the transmission of the SRS under this scenario.

Specifically, the method for transmitting the uplink SRS described in various embodiments of the present disclosure includes a method for transmitting the SRS performed by a terminal, a method for receiving the SRS and a channel estimation Method that are performed by a base station. In the method for transmitting the SRS, the terminal obtains configuration and triggering information of the SRS. Based on the SRS configuration and triggering information, the terminal configures and triggers SRS transmission at a downlink carrier or an uplink carrier of the flexible duplex and determines resources occupied by the SRS. In this case, the triggering of the SRS includes two triggering types, i.e., type 0 is to trigger the SRS through higher layer signaling and type 1 is to trigger the SRS through physical layer signaling. Specific configuration parameters of the SRS may follow parameter configuration of TDD or FDD or use a new parameter configuration. Then, the terminal obtains information related to SRS power control, determines an SRS power value, and transmits the SRS at the determined resources occupied by the SRS. In the method for receiving the SRS and the channel estimation method that are performed by the base station, the base station receives the uplink SRS at the downlink carrier and the uplink carrier of the flexible duplex, and obtains downlink channel information based on the SRS. During the SRS transmission, the transmission of the SRS at the terminal and the reception of the SRS and the channel estimation at the base station are implemented by cooperating with each other, so for convenience of description, hereinafter processing on both sides may be described together.

Figure 3:
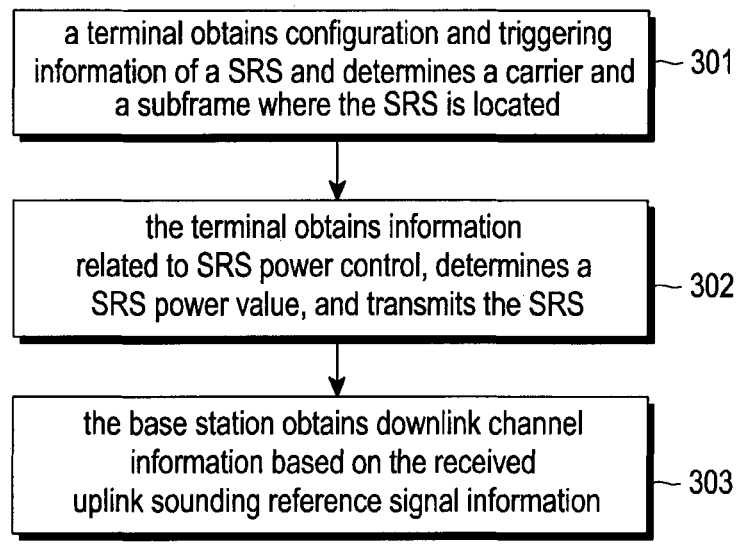
FIG. 3 is a flowchart illustrating a method for transmitting an uplink sounding reference signal, according to various embodiments of the present disclosure.

FIG. 3 is a flowchart illustrating a method for transmitting an uplink sounding reference signal, according to various embodiments of the present disclosure. The method may include following operations.

At block 301, a terminal obtains configuration and triggering information of an SRS and determines a carrier and a subframe where the SRS is located.

The terminal configures and triggers the transmission of the SRS at a designated carrier according to the SRS configuration and triggering information. Assuming a downlink carrier and an uplink carrier of an FDD system can both be configured with SRS resources, a mechanism is required to configure and trigger the SRS transmission at the uplink and/or downlink carriers of the FDD system and determine the resources occupied by the SRS. In this case, the carrier where the SRS is located needs to be determined. On the other hand, the subframe on the carrier where the SRS is located needs to be determined. Here, what is different from the prior art is that the SRS may be transmitted at an FDD downlink carrier and an uplink carrier of the flexible duplex. At the same time, the SRS may be transmitted at an uplink subframe or an downlink subframe on the corresponding carrier. However, hereinafter in some cases, the SRS is limited to be transmitted only at an uplink subframe. A symbol position of the SRS on the corresponding carrier and subframe may be determined by the terminal or determined by standards, which is not limited herein.

Currently, the configuration and triggering of the SRS includes a cell-specific SRS configuration and a UE-specific SRS triggering. In this case, the UE-specific SRS triggering includes two triggering types, i.e., type 0 is to trigger the SRS through higher layer signaling and type 1 is to trigger the SRS through physical layer signaling, in which the physical layer signaling includes uplink Grant (UL Grant) scheduling uplink data and downlink Grant (DL Grant) scheduling downlink data. In this case, in the type 0 SRS triggering, the higher layer signaling includes triggering information and configuration parameters. In the type 1 SRS triggering, the physical layer signaling is used to trigger the SRS transmission at the designated carrier and the configuration parameters are transmitted through the higher layer signaling. The cell-specific SRS configuration is indicated by higher layer signaling of a cell.

For the cell-specific SRS and the UE-specific SRS, if a pair of FDD uplink carrier and FDD downlink carrier form a serving cell, the two carriers may use different parameters to configure and trigger the SRS. The SRS configuration and triggering parameters may indicate the FDD uplink carrier or the FDD downlink carrier that the corresponding signaling acts on. For example, the cell-specific configuration signaling indicated by higher layer signaling, the SRS signaling of which the triggering type is 0, and/or the SRS configuration signaling of which the triggering type is 1 include a field indicating an uplink carrier or a downlink carrier that the corresponding signaling acts on. In another example, when the uplink carrier may be configured as a flexible duplex carrier, (thus the SRS configuration and triggering can be transmitted in the uplink carrier) a carrier where the SRS higher layer signaling acts may be the carrier used for transmitting the signaling, in which the SRS higher layer signaling refers to the cell-specific configuration signaling, the SRS signaling of which the triggering type is 0, and the SRS configuration signaling of which the triggering type is 1. Still in another example, it may be defined that SRS higher layer signaling at some downlink subframes may act on a downlink carrier and SRS higher layer signaling at other downlink subframes may act on an uplink carrier. According to various example embodiments of the present disclosure, the paired FDD uplink and downlink carriers refer to a paired carriers that may be applied to an FDD cell in LTE Rel 8.

Hereinafter, the way for determining the carrier transmitting the SRS in the type 0 SRS triggering and type 1 SRS triggering is described. According to various example embodiments of the present disclosure, an uplink carrier and a downlink carrier may be configured as different serving cells. The two carriers correspond to different cell IDs and are assigned with different cell parameters. The FDD uplink carrier and FDD downlink carrier may also be configured as a serving cell for signal transmission. Hereinafter, different processing methods are described for these two scenarios.

For triggering type 0, when the FDD uplink carrier and FDD downlink carrier are configured as different serving cells for processing, the triggering of the SRS transmission at a corresponding carrier may be performed in higher layer signaling of each of the cells, and different SRS configuration parameters may be respectively configured for the uplink carrier and the downlink carrier, such as information like an SRS periodicity and/or an offset. When the FDD uplink carrier and FDD downlink carrier are configured as one serving cell, it may be further determined at which carrier in the uplink carrier and the downlink carrier the SRS transmission is to be triggered, for example, an indicator used for distinguishing the uplink carrier and the downlink carrier is added to the higher layer signaling of which the triggering type is 0. When this method is employed, the uplink and downlink carriers may also be configured with different SRS configuration parameters, such as information like the SRS periodicity and/or the offset. According to various examples of the present disclosure, two carriers of a cell may refer to a paired carriers that may be applied to an FDD cell in LTE Rel8, or may not be limited to the paired carriers that may be applied to the FDD cell.

For triggering type 1, the SRS transmission at which carrier triggered by the physical layer signaling may be determined according to following ways.

In way a, the carrier used for transmitting the SRS may be determined according to a carrier where physical layer signaling scheduling data is located. That is, the carrier where the physical layer signaling scheduling data is located is the carrier used for transmitting the SRS. For example, when the physical layer signaling triggering the SRS transmission is DL Grant and the physical layer signaling includes a Carrier Indicator Field (CIF), the physical layer signaling triggers uplink SRS transmission at a downlink carrier corresponding to the CIF. In another example, when the physical layer signaling triggering the SRS transmission is DL Grant and the physical layer signaling does not include the CIF, the data scheduled by the physical layer signaling and the physical layer signaling are on the same carrier, and an SRS request field in the physical layer signaling triggers the uplink SRS transmission at an uplink or downlink carrier where the physical layer signaling is located. Still in another example, when the physical layer signaling triggering the SRS transmission is UL Grant and the physical layer signaling schedules physical uplink shared channel (PUSCH) transmission at a serving cell c, the physical layer signaling triggers the SRS transmission of an uplink carrier corresponding to the serving cell c.

In way b, the carrier used for transmitting the SRS may be determined according to a type of the physical layer signaling scheduling data. When the physical layer signaling triggering the SRS transmission is DL Grant used for scheduling downlink data, e.g., the physical layer signaling is Downlink Control Information (DCI) format 1A/2B/2C, the FDD downlink carrier is the carrier used for transmitting the SRS. When the physical layer signaling triggering the SRS transmission is UL Grant used for scheduling uplink data, e.g., the physical layer signaling is DCI format 0/4, the FDD uplink carrier is the carrier used for transmitting the SRS. In this case, when a carrier direction of the SRS transmission is determined, the carrier may further be determined according to the CIF in the physical layer signaling.

In way c, the carrier used for transmitting the SRS may be determined according to the carrier where the physical layer signaling is located, i.e., the carrier where the physical layer signaling is located is configured as the carrier transmitting the SRS. For example, when the physical layer signaling triggering the SRS transmission is at a downlink carrier and the physical layer signaling is DL Grant or UL Grant, the physical layer signaling triggers the SRS transmission at the downlink carrier. In another example, when the physical layer signaling triggering the SRS transmission is at an uplink carrier and the physical layer signaling is DL Grant or UL Grant, the physical layer signaling triggers the SRS transmission at the uplink carrier.

The carrier of the UE-specific SRS transmission is determined through the above processing. Hereinafter, which SRS configuration parameter (which may be used to determine an SRS subframe) is used at the corresponding carrier is to be discussed. According to various embodiments of the present disclosure, two parameter configuration ways are described. In a first way, TDD or FDD parameter configuration may be followed. In a second way, a new parameter configuration may be used. The first way is discussed first. According to the first way, the SRS configuration parameter may be determined. At the same time, for the cell-specific SRS transmission, the SRS triggering may also be performed in the TDD or FDD mode, which may be conformably described hereinafter. Different processing ways may be described as follows.

In situation a, an FDD downlink carrier and an FDD uplink carrier share the same SRS configuration and triggering information. If the FDD uplink carrier of a serving cell performs the SRS configuration and triggering according to the FDD mode (e.g., when the FDD uplink carrier is only used for uplink transmission and is not used for downlink transmission, the FDD uplink carrier performs the SRS configuration and triggering in accordance with the FDD mode), the SRS of the FDD uplink/downlink carrier may be configured and triggered in accordance with the FDD mode of the LTE 12 and previous versions. And/or, if the FDD uplink carrier of the serving cell performs the SRS configuration and triggering in accordance with the TDD mode (e.g., when the FDD uplink carrier supports the uplink transmission and the downlink transmission, the SRS configuration and triggering is performed in accordance with the TDD mode), the SRS of the FDD uplink/downlink carrier may be configured and triggered in accordance with the TDD mode of the LTE 12 and previous versions.

In situation b, the FDD uplink carrier and the FDD downlink carrier share the same SRS configuration and triggering information, the SRS of the FDD uplink/downlink carrier may be configured and triggered in accordance with the FDD mode of the LTE 12 and previous versions.

In situation c, the FDD uplink carrier and the FDD downlink carrier share the same SRS configuration and triggering information, the SRS of the FDD uplink/downlink carrier may be configured and triggered in accordance with the TDD mode of the LTE 12 and previous versions.

In situation d, if the paired FDD uplink carrier and FDD downlink carrier share the same SRS configuration and triggering information, it may be assumed that a user equipment (UE) obtains actual uplink and downlink subframe distribution at the current FDD uplink carrier through the higher layer signaling or the physical layer signaling (for example, a base station sends reconfiguration DCI of one, more or all of the UEs). If the UE does not know whether the FDD uplink carrier of the serving cell may perform downlink transmission, e.g., the UE does not correctly detect reconfiguration DCI of a current radio frame and the UE needs to determine the SRS configuration and triggering mode (using FDD or TDD) according to whether or not the uplink carrier supports the downlink transmission, the UE ignores the received SRS configuration of the uplink and downlink carriers without performing the corresponding SRS transmission until receiving an indication indicating whether the FDD uplink carrier supports the downlink transmission, the UE recovers the SRS transmission according to the received indication.

In situation e, if the paired FDD downlink carrier and the FDD uplink carrier construct a serving cell, the FDD downlink carrier and the FDD uplink carrier may use different ways to configure and trigger the SRS. The base station notifies whether a configuration and triggering mode of each FDD carrier is FDD or TDD through the higher layer signaling; or whether the FDD or TDD mode is used are predetermined.

In situation f, if the paired FDD downlink carrier and the FDD uplink carrier construct two serving cells and each cell may use a set of SRS configuration and triggering parameters, the serving cell corresponding to the FDD downlink carrier may configure the SRS in accordance with the FDD or TDD mode of the LTE 12 and previous versions. Alternatively, under this situation, the base station uses the higher layer signaling or the physical layer signaling to notify the UE to use the TDD or FDD mode to configure the SRS. If the UE uses a carrier aggregation mode, each FDD downlink carrier and FDD uplink carrier may be treated as a single serving cell. The SRS configuration on each FDD downlink carrier may be configured in the FDD or TDD mode according to specific requirements. For example, when a UE that does not support a downlink carrier of the flexible duplex is considered, the SRS on the UE FDD downlink carrier may be configured and triggered in accordance with the FDD mode. In another example, when interference between adjacent cells is considered, the system configures and triggers the SRS on the UE FDD downlink carrier in accordance with the TDD mode.

Hereinafter, special processing performed on a periodic SRS is described. In this case, the enhanced Interference Management and Traffic Adaptation (eIMTA) or a new processing method may be employed.

In method a, when a subframe transmission direction of an uplink carrier is changeable and the UE does not know actual subframe uplink and downlink distribution at the FDD uplink carrier of the serving cell, e.g., the UE does not correctly detect the reconfiguration DCI of the current radio frame, the UE ignores the SRS configuration of which the triggering type is 0 and does not perform the corresponding SRS transmission.

In method b, when the subframe transmission direction of the uplink carrier is changeable and the UE does not know the actual subframe uplink and downlink distribution at the FDD uplink carrier of the serving cell, then according to downlink Hybrid Automatic Repeat Request (HARQ) reference configuration, for a subframe which is not used for uplink and UpPTS and when the PUSCH is not scheduled on the subframe, the UE does not perform the SRS transmission of which the triggering type is 0 on the subframe.

The above SRS parameter configuration describes the method for configuring and triggering the SRS in accordance with TDD or FDD. At an uplink carrier of the flexible duplex, the FDD UL may be configured as 8 ms uplink/downlink configuration. In this case, the cell-specific SRS and the UE-specific SRS need to add a processing manner of an 8 ms periodicity. The method for determining the carrier used for transmitting the SRS may be described as follows.

Figure 4:
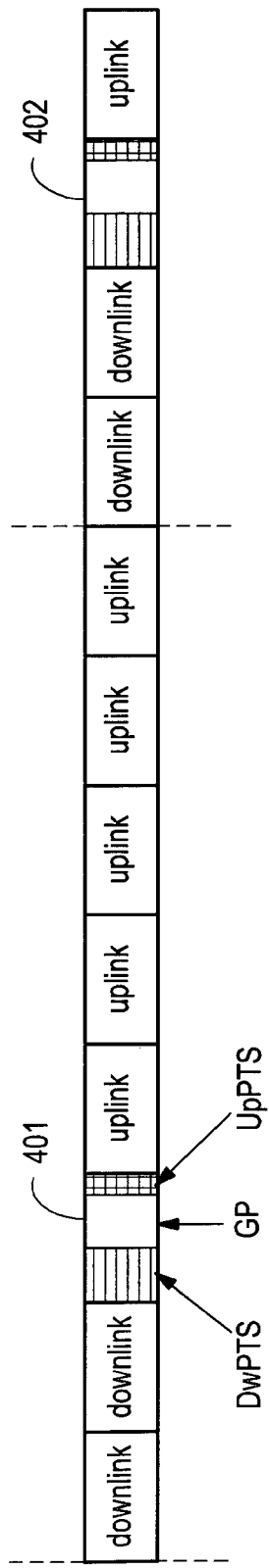
FIG. 4 is a diagram illustrating a frame structure in a hybrid duplex communication system, according to various embodiments of the present disclosure.

In method a, when an uplink carrier of the FDD system may transmit an uplink signal and a downlink signal, a transmission direction of a subframe of the FDD uplink carrier may be configured in accordance with the 8 ms periodicity, i.e., a switch-point periodicity from the downlink to the uplink is 8 ms, as shown in FIG. 4. In the figure, the uplink subframe and the downlink subframe are marked. Subframes 401 and 402 are special subframes as described previously, which represent the special subframes used for the three fields including DwPTS, GP, and UpPTS. When the SRS is transmitted only on the special subframe and the uplink subframe (i.e., the SRS is not transmitted on a downlink subframe), the SRS may be configured in accordance with the FDD or TDD mode of LTE 12 and previous versions. If the configured and triggered SRS is to be transmitted at the downlink subframe, the UE ignores the SRS transmission on the downlink subframe, i.e., the SRS transmission is not performed.

In method b, when the downlink-to-uplink switch-point periodicity of the FDD uplink carrier is 8 ms and the SRS is transmitted only on the special subframe and the uplink subframe, a new way is used to configure the subframe used for transmitting the SRS. Since subframes between which the interval is 8 ms are all the uplink subframes or all the downlink subframes according to the downlink-to-uplink switch-point periodicity of 8 ms, in the new SRS configuration way, a transmission periodicity of the cell-specific SRS and the UE-specific SRS may be an integer multiple of 4 ms and the SRS is transmitted with corresponding offset within the SRS transmission periodicity, such as an SRS subframe periodicity of 4 ms and the subframe offset may be 0, 1, 2 or 3. Specific implementations are described in a first, second, and third example embodiment of the present disclosure.

That the SRS transmission is performed on which subframe of which carrier and the specific SRS configuration parameters may be determined by the above methods.

At block 302, the terminal obtains information related to SRS power control, determines an SRS power value, and transmits the SRS.

Before the terminal transmits the SRS, the power control may be performed to the SRS. When the power control on the SRS performed by the FDD downlink carrier and the FDD uplink carrier is processed, if the system configures the FDD downlink carrier and the FDD uplink carrier as different cells for processing and a cell corresponding to the FDD uplink carrier is denoted as cell c, the SRS transmission power on subframe i may be determined according to $P_{SRS,c}(i)$ in 5.1.3 of 3GPP TS 36.213 v10.2.0, i.e., $P_{SRS,c}(i)=\min \{P_{CMAX,c}(i), P_{SRS\_OFFSET,c}(m)+10 \log_{10}(M_{SRS,c})+P_{O\_PUSCH,d}(j)+\alpha_c(j)\cdot PL_c+f_c)(i)\}$. Among them, the meaning and value of each physical variable are the same as those in 5.1.3 of 3GPP TS 36.213 v10.2.0.

If a cell corresponding to the FDD downlink carrier is denoted as cell c, the UE transmission power of the SRS on subframe i $P_{SRS,c}(i)$ may be determined according to a following formula:

$$P_{SRS,c}(i)=\min\{P_{CMAX,c}(i), P_{SRS\_OFFSET,c}(m)+10 \log_{10}(M_{SRS,c})+\alpha_c(j)\cdot PL_c+f_c)(i)\} \quad (1)$$

or, $$P_{SRS,c}(i)=\min\{P_{CMAX,c}(i), P_{SRS\_OFFSET,c}(m)+10 \log_{10}(M_{SRS,c})+P_{O\_PUSCH,d}(j)+\alpha_c(j)\cdot PL_c+f_c)(i)\} \quad (2)$$

Among them, $P_{CMAX,c}(i)$, $P_{SRS\_OFFSET,c}(m)$, $M_{SRS,c}$, $P_{O\_PUSCH,d}(j)$, and $\alpha_c(j)$ are determined by the definitions in 5.1.3 of 3GPP TS 36.213 v10.2.0. $P_{O\_PUSCH,d}(j)$ represents a PUSCH power control parameter of a cell d, in which an uplink carrier where the cell d is located and an downlink carrier where the cell c is located may construct a paired FDD carriers in LTE Rel 8. $PL_c$ is determined by the definitions in 5.1.1. $f_c(i)$ is an uplink power control adjustment value of the serving cell c. According to various embodiments of the present disclosure, for a downlink carrier, $f_c(i)$ may be obtained through Transmitter Power Control (TPC) corresponding to Downlink Control Information (DCI) format 3/3A in accordance with the description of $f_c(i)$ in 5.1.1.1 of TS 36.213 v10.2.0, or may be obtained by correcting $f_c(i)$ in 5.1.1.1. In fact, $f_c(i)$ is a dynamic power offset. In 5.1.1.1, $f_c(i)$ may be indicated by the TPC in the physical layer signaling UL Grant or by the TPC in the DCI format 3/3A. When the FDD downlink carrier is not allowed to transmit the PUSCH, there is no corresponding physical layer control signaling UL Grant on the downlink carrier. Therefore, according to various examples of the present disclosure, when the SRS transmission power is calculated for the downlink carrier, $f_c(i)$ is only indicated by DCI format 3/3A, as described in 5.1.1.1. According to various embodiments of the present disclosure, when the SRS transmission power is calculated for the downlink carrier, $f_c(i)$ may be determined according to the TPC indication of the DL Grant, which may be described later.

Compared the above formula (2) with formula (1), the SRS transmission power in formula (2) considers the PUSCH power control parameter $P_{O\_PUSCH,d}(j)$ This is because the existing SRS is transmitted on the uplink carrier and the PUSCH is also transmitted on the uplink carrier, the PUSCH power control parameter may be considered due to the similarity of channel characteristics. However, according to various embodiments of the present disclosure, for the SRS transmission on the downlink carrier, channel characteristics of the downlink carrier and the PUSCH are different, and therefore the SRS transmission power may be calculated according to formula (1) without considering the PUSCH power control parameter.

Hereinafter, the method for determining $f_c(i)$ is described in detail. The conventional DCI format 3/3A only indicates the uplink carrier power control of a serving cell. According to various embodiments of the present disclosure, a method for indicating the SRS power control of the downlink carrier by DCI format 3/3A is described. The first indicating method may be implemented as follows. A pair of FDD uplink carrier and FDD downlink carrier in LTE Release 8 may be two cells or one cell. In order to distinguish a carrier on which DCI format 3/3A acts, an acted carrier may be explicitly indicated. For example, an indicator field is added to DCI format 3/3A, in which the indicator field includes the CIF and an uplink/downlink indicator field. When the CIF in the DCI format 3/3A received by the UE corresponds to the serving cell c and the uplink/downlink indicator field is "1" (or "0"), the DCI format 3/3A acts on a downlink (or uplink) carrier of the serving cell c. In another example, the indicator field only includes the uplink/downlink indicator field. When the UE receives DCI format 3/3A at the serving cell d and the uplink/downlink indicator field is "downlink", the DCI format 3/3A acts on a downlink carrier of the serving cell d. When the uplink/downlink indicator field is "uplink", the DCI format 3/3A acts on an uplink carrier of primary serving cell.

According to the second indicating method, the Cyclic Redundancy Check (CRC) of DCI format 3/3A of the downlink carrier is scrambled using an SRS-dedicated Radio Network Temporary Identifier (RNTI). When the UE detects the DCI scrambled with the dedicated RNTI, the UE may determine that the DCI format acts on the downlink carrier. For example, when the UE receives the DCI format 3/3A scrambled with the SRS-dedicated RNTI at the serving cell c, the DCI format 3/3A acts on the downlink carrier. When the UE detects the DCI format 3/3A and the DCI is not scrambled with the downlink carrier SRS-dedicated RNTI, the UE may determine that the DCI format acts on the uplink carrier.

According to the third indicating method, the DCI format 3/3A includes the TPC of the uplink carrier and the TPC of the downlink carrier. Each TPC in the DCI format 3/3A has a corresponding serial number and a higher layer parameter indicates the serial number of TPC of each uplink carrier and downlink carrier of the UE. The UE reads the TPC of the corresponding serial number from the DCI format 3/3A. For example, in DCI format 3, the higher layer signaling indicates a serial number of the TPC of one or multiple carriers of the UE. When the higher layer signaling indicates a serial number of the TPC of one carrier, the carrier may be an uplink carrier or a downlink carrier. When the higher layer signaling indicates serial numbers of the TPC of multiple carriers, the multiple carriers may include both the uplink carrier and the downlink carrier.

According to the fourth indicating method, the DCI format 3/3A on some subframes may be defined to act on the downlink carrier and the DCI format 3/3A on other subframes may be defined to act on the uplink carrier.

Obviously, the above four methods for indicating the carrier corresponding to the DCI format 3/3A are applicable to a situation where the SRS transmission is at the uplink carrier and the downlink carrier and are not only for the SRS transmission of the downlink carrier. The above four methods may be used in any combination. For example, the third indicating method may be combined with the second indicating method, in which the direction of the carrier where the DCI format acts is indicated by the downlink carrier SRS-dedicated RNTI scrambling and a TPC serial number of the UE downlink carrier is determined using the higher layer parameter.

Hereinafter, the determination of $f_c(i)$ using the TPC indicator of the DL Grant may be described, i.e., the correction of 5.1.1.1. Specifically, the TPC in the UL Grant required by calculating of $f_c(i)$ is replaced with the TPC of the DL Grant. For example, when the DL Grant is transmitted on the serving cell c, the TPC in the DL Grant is used to calculate $f_c(i)$. In another example, when the DL Grant on a serving cell schedules a Physical Downlink Shared Channel (PDSCH) on the serving cell c, the TPC in the DL Grant is used to calculate $f_c(i)$. The TPC in the DL Grant is originally used for the power control of the Physical Uplink Control Channel (PUCCH) but is used for the SRS power control herein.

For the SRS power control on the FDD downlink carrier and the uplink carrier, when the system configures the FDD downlink carrier and the uplink carrier as the same cell for processing, the SRS transmission power on the uplink carrier and downlink carrier of the cell c may be determined as follows.

Assuming the UE transmission power of the SRS of the downlink carrier of the cell c on subframe i $P_{SRS,c,DL}(i)$ is defined by a following formula:

$$P_{SRS,c,DL}(i) = \min \begin{Bmatrix} P_{CMAX,c,DL}(i), \\ P_{SRS\_OFFSET,c,DL}(m) + 10\log_{10}(M_{SRS,c,DL}) + \\ P_{O\_PUSCH,c}(j) + \alpha_{c,DL}(j) \cdot PL_c + f_{c,DL}(i) \end{Bmatrix} \quad (3)$$

The UE transmission power of the SRS of the uplink carrier of the cell c on subframe i is denoted as $P_{SRS,c,UL}(i)$. $P_{SRS,c,UL}(i)$ may be defined to be equivalent to $P_{SRS,c}(i)$ in 5.1.3 of 3GPP TS 36.213 v10.2.0.

Alternatively, the power $P_{SRS,c,DL}(i)$ on the downlink carrier of the cell c is independent of the PUSCH power control parameter $P_{O\_PUSCH,c}(j)$ of the uplink carrier:

$$P_{SRS,c,DL}(i) = \min\{P_{CMAX,c,DL}(i), P_{SRS\_OFFSET,c,DL}(m) + 10 \log_{10}(M_{SRS,c,DL}) + \alpha_{c,DL}(j) \cdot PL_c + f_{c,DL}(i)\} \quad (4)$$

Among them, $P_{O\_PUSCH,c}(j)$ is determined according to the definition in 5.1.3 of 3GPP TS 36.213 v10.2.0 and $PL_c$ is determined according to the definition in 5.1.1.

In formulas (3) and (4), $P_{CMAX,c,DL}(i)$, $P_{SRS\_OFFSET,c,DL}(m)$, $M_{SRS,c,DL}$, and $\alpha_{c,DL}(j)$ are power control parameters of the downlink carrier of the serving cell c. Replacing "the serving cell c" in descriptions of $P_{CMAX,c,DL}(i)$ $P_{SRS\_OFFSET,c,DL}(m)$, $M_{SRS,c,DL}$ and $\alpha_{c,DL}(j)$ in 5.1.3 of 3GPP TS 36.213 v10.2.0 with "the downlink carrier of the serving cell c" to obtain $P_{CMAX,c,DL}(i)$, $P_{SRS\_OFFSET,c,DL}(m)$, $M_{SRS,c,DL}$, and $\alpha_{c,DL}(j)$.

Alternatively, for $P_{CMAX,c,DL}(i)$, $P_{SRS\_OFFSET,c,DL}(m)$ and/or $\alpha_{c,DL}(j)$, the higher layer configures a set of parameters for the serving cell c, rather than respectively configuring two sets of parameters for the uplink carrier and the downlink carrier, i.e., only $P_{CMAX,c,DL}(i)$, $P_{SRS\_OFFSET,c,DL}(m)$ and/or $\alpha_{c,DL}(j)$ are configured. As such, in formulas (1) and (2), $P_{CMAX,c,DL}(i)$, $P_{SRS\_OFFSET,c,DL}(m)$ and/or $\alpha_{c,DL}(j)$ may be replaced with $P_{CMAX,c}(i)$, $P_{SRS\_OFFSET,c}(m)$ and/or $\alpha_c(j)$, in which $P_{CMAX,c}(i)$, $P_{SRS\_OFFSET,c}(m)$ and/or $\alpha_c(j)$ are defined by 5.1.3 of 3GPP TS 36.213 v10.2.0.

$f_{c,DL}(i)$ is a downlink carrier power control adjustment value of the serving cell c, which is obtained by inputting $f_c(i)$ in 5.1.1.1, of TS 36.213 v10.2.0 to the TPC in DCI format 3/3A indicating the downlink carrier of the serving cell c, or by replacing the TPC in the UL Grant required by calculating $f_c(i)$ in 5.1.1.1 with the TPC in the DL Grant corresponding to the downlink carrier of the serving cell c. For example, the TPC in the corresponding DL Grant is the TPC in the DL Grant transmitted on the downlink carrier of the serving cell c or the TPC in the DL Grant scheduling the downlink carrier data of the serving cell c.

In summary, when the terminal obtains the SRS power control information, if the carrier where the SRS transmission is located is an uplink carrier, the power control adjustment value $f_c(i)$ may be indicated by the TPC in DCI format 3/3A corresponding to the uplink carrier or by the TPC in UL Grant. If the carrier where the SRS transmission is located is an downlink carrier, the power control adjustment value $f_c(i)$ or $f_{c,DL}(i)$ may be indicated by the TPC in DCI format 3/3A corresponding to the downlink carrier or by the TPC in DL Grant.

In addition, when determining the SRS transmission power and transmitting the SRS, some special circumstances are considered. Hereinafter, channel collisions such as SRS and SRS, SRS and SIB, SRS and paging are described.

When the FDD downlink carrier, the FDD uplink carrier and another aggregated carrier transmit the SRS simultaneously and a total UE SRS transmission power within a symbol is greater than $\hat{P}_{CMAX}(i)$, in which $\hat{P}_{CMAX}(i)$ is a linear value of $P_{CMAX}$ in subframe i and $P_{CMAX}$ is defined in 3GPP TS36.101, the UE may use two ways described as follows to ensure the total UE SRS transmission power within the same symbol is not greater than $\hat{P}_{CMAX}(i)$. According to the first way, the UE may discard the SRS transmission on the downlink carrier and perform the SRS transmission on the uplink carrier, so that the base station may effectively schedule the PUSCH based on the estimation of the uplink carrier SRS, and thus efficient transmission of the PUSCH can be ensured. In this case, the symbol refers to a Single Carrier Frequency Division Multiplexing Access (SC-FDMA) symbol and/or an Orthogonal Frequency Division Multiplexing Access (OFDMA) symbol. Alternatively, according to the second way, when the total SRS transmission power of multiple UE aggregated carriers within a symbol is greater than $\hat{P}_{CMAX}(i)$, the UE may discard the SRS transmission on the uplink carrier and perform the SRS transmission on the downlink carrier. Generally, the frequency of the SRS transmission on the FDD downlink carrier is less than that of the SRS transmission on the uplink carrier, therefore, if the SRS transmission on the downlink carrier is discarded, the corresponding downlink channel characteristics are not obtained within a long period of time.

When the FDD downlink carrier supports a lower version UE, in which the lower version UE refers to a UE that does not support transmitting the SRS on the FDD downlink carrier, when the SRS is transmitted on the FDD downlink carrier, the lower version UE still assumes the downlink data transmission at a symbol transmitting the SRS, which causes a PDSCH decoding error of the lower version UE. In order to avoid this issue, the lower version UE may receive a subframe of the downlink data and the UE does not perform the SRS transmission on the subframe. The downlink data or subframe includes a SIB1 (System Information Block), a paging signal, a Multimedia Broadcast Single Frequency Network (MBSFN) subframe, and/or a subframe transmitting Semi-Persistent Scheduling (SPS) of the lower version UE.

Specifically, in order to make the UE know which subframe of the FDD downlink carrier is allowed to transmit the SRS, the base station may notify the UE that the configuration and triggering of the SRS is allowed at which subframe through the higher layer signaling and maybe in a bit mapping manner. For example, when M subframes construct a periodicity, the base station informs the UE of M-bit higher layer signaling and each bit corresponds to one subframe within the periodicity. When a bit corresponding to a subframe is 1, the SRS transmission is allowed. When a bit corresponding to a subframe is 0, the SRS transmission is not allowed. In this case, a value of M may be 40.

At block 303, the base station obtains channel information based on the received uplink sounding reference signal information.

The base station measures the uplink channel or estimates the channel fading according to the received uplink sounding reference signal. The base station may further configure an estimated value as the measurement or channel fading estimation of a corresponding downlink channel. In this case, the corresponding downlink channel is a downlink channel on the carrier carrying the SRS. From the space point of view, the corresponding downlink channel is a downlink channel among a plurality of antennas used for carrying the SRS uplink channel. For example, an antenna A is an antenna at the base station side and an antenna B is a terminal antenna. When the terminal transmits an uplink SRS to the antenna A of the base station through the antenna B, a channel measurement result or a channel fading estimation result obtained according to the uplink SRS may be configured as a channel measurement result or a channel fading estimation result of a downlink channel between the antenna B and the antenna A.

When the corresponding downlink channel information is obtained using the SRS, considering that the downlink channel information may be part of the downlink channel information, therefore, the SRS channel may be combined with another channel measurement result or channel estimation result that is reported by the UE to the base station to form the complete downlink channel information. In this case, at block 302, the UE may report the channel measurement result or the channel estimation result of the downlink channel determined according to the downlink reference symbol issued by the base station. For example, the SRS channel may be combined with a Channel Quality Indicator (CQI) measured by the UE based on the downlink reference symbol and reported by the UE to construct a measurement of the channel quality, such as when a wideband CQI is measured based on the SRS and a subband CQI is reported by the UE, the base station combines the wideband CQI measured by the SRS and the subband CQI reported by the UE to form a total CQI, and performs uplink and/or downlink scheduling based on the total CQI.

In another example, the UE is configured with $R_U$ receiving antennas and $T_U$ transmitting antennas. Generally, the number of the transmitting antennas at the UE side is less than or equal to the number of the receiving antennas, i.e., $T_U \leq R_U$. Thus, the base station could not obtain the channel estimation among all of downlink transmitting and receiving antennas based on the channel estimation of the SRS. For example, the UE is configured with two antennas B and C, in which the antenna B may two-way transmit and receive data and the antenna C may only receive data. The base station is configured with a receiving antenna A. The base station may estimate the downlink channel characteristics between the antenna A and the antenna B based on the uplink SRS transmitted by the UE. However, the downlink channel characteristics between the antenna A and the antenna C could not be determined according to the uplink SRS. In this case, the base station may instruct the UE to report channel estimation of part of the UE receiving antennas, in which the part of the antennas are used as the receiving antennas of the UE and not used as the transmitting antenna (i.e., the antenna C in the above example). When the base station receives the reporting, the base station combines the reported channel information of the part of the antennas (i.e., the antenna C) with the channel information estimated according to the SRS (i.e., the downlink channel between the antenna B and the antenna A) and performs corresponding pre-coding processing.

Hereinafter, the technical scheme described in various example embodiments of the present disclosure is described in further detail with reference to several example embodiments.

A First Embodiment

The first embodiment describes a method for determining an SRS subframe in the cell-specific SRS transmission when the downlink-to-uplink switch-point periodicity of the FDD uplink carrier is configured in accordance with the 8 ms periodicity.

When an uplink carrier of the FDD system may transmit an uplink signal and a downlink signal, the downlink-to-uplink switch-point periodicity of the FDD uplink carrier may be configured in accordance with the 8 ms periodicity. Tables 3-5 illustrate examples of the 8 ms downlink-to-uplink switch-point periodicity, in which "D" represents a subframe dedicated to downlink transmission, "U" represents a subframe dedicated to uplink transmission, and "S" represents a special subframe.

TABLE 3

Uplink/Downlink Configuration

| uplink-downlink configuration | Downlink-to-uplink switch-point periodicity | subframe number within the downlink-to-uplink switch-point periodicity | | | | | | | |
|---|---|---|---|---|---|---|---|---|---|
| | | 0 | 1 | 2 | 3 | 4 | 5 | 6 | 7 |
| 0 | 8 ms | S | U | U | U | U | U | U | U |
| 1 | 8 ms | S | U | U | U | U | U | U | D |
| 2 | 8 ms | S | U | U | U | U | U | D | D |
| 3 | 8 ms | S | U | U | U | U | D | D | D |
| 4 | 8 ms | S | U | U | U | D | D | D | D |
| 5 | 8 ms | S | U | U | D | D | D | D | D |
| 6 | 8 ms | S | U | D | D | D | D | D | D |

TABLE 4

Uplink/Downlink Configuration

| uplink-downlink configuration | Downlink-to-uplink switch-point periodicity | subframe number within the downlink-to-uplink switch-point periodicity | | | | | | | |
|---|---|---|---|---|---|---|---|---|---|
| | | 0 | 1 | 2 | 3 | 4 | 5 | 6 | 7 |
| 0 | 8 ms | U | S | U | U | U | U | U | U |
| 1 | 8 ms | D | S | U | U | U | U | U | U |
| 2 | 8 ms | D | S | U | U | U | U | U | D |
| 3 | 8 ms | D | S | U | U | U | U | D | D |
| 4 | 8 ms | D | S | U | U | U | D | D | D |
| 5 | 8 ms | D | S | U | U | D | D | D | D |
| 6 | 8 ms | D | S | U | D | D | D | D | D |

TABLE 5

Uplink/Downlink Configuration

| uplink-downlink configuration | Downlink-to-uplink switch-point periodicity | subframe number within the downlink-to-uplink switch-point periodicity | | | | | | | |
|---|---|---|---|---|---|---|---|---|---|
| | | 0 | 1 | 2 | 3 | 4 | 5 | 6 | 7 |
| 0 | 8 ms | U | S | U | U | U | U | U | U |
| 1 | 8 ms | D | S | U | U | U | U | U | U |
| 2 | 8 ms | D | S | U | U | U | U | U | D |
| 3 | 8 ms | D | S | U | U | U | U | D | D |

TABLE 5-continued

Uplink/Downlink Configuration

| uplink-downlink configuration | Downlink-to-uplink switch-point periodicity | subframe number within the downlink-to-uplink switch-point periodicity | | | | | | | |
|---|---|---|---|---|---|---|---|---|---|
| | | 0 | 1 | 2 | 3 | 4 | 5 | 6 | 7 |
| 4 | 8 ms | D | S | U | U | U | D | D | D |
| 5 | 8 ms | D | S | U | U | D | D | D | D |
| 6 | 8 ms | D | S | U | D | D | D | D | D |
| 7 | 8 ms | D | D | D | D | D | D | D | D |

When the downlink-to-uplink switch-point periodicity is 8 ms, each radio frame includes 10 subframes. The downlink-to-uplink switch-point periodicity is 8 ms and a common multiple of 10 and 8 is 40, so that it may be defined that the first subframe of every four radio frames is aligned with subframe 0 of the 8 ms switch-point periodicity. For example, assuming $n_f$ is a serial number of a radio frame, the first subframe of a radio frame meeting $n_f \mod 4 = 0$ is aligned with subframe 0 of the 8 ms switch-point periodicity. The structure constructed by the four radio frames is referred to as a radio superframe.

Hereinafter, a method for configuring a cell-specific SRS subframe in a serving cell when the downlink-to-uplink switch-point periodicity of the FDD uplink carrier is configured in accordance with 8 ms. In this case, it is assumed that the SRS is transmitted just on a special subframe and an uplink subframe.

At block 401, a terminal obtains cell-specific configuration information of an SRS and determines a cell-specific SRS subframe.

It is assumed that $T_{SFC}$ and $\Delta_{SFC}$ respectively are a cell-specific SRS subframe periodicity and a cell-specific SRS subframe absolute value. The standard defines values of $T_{SFC}$ and $\Delta_{SFC}$. Table 6 illustrates an example, in which srs-SubframeConfig is indicated by the higher layer signaling and the cell-specific SRS subframe satisfies a following formula:

$$[(10n_f \bmod 40) + \lfloor n_s/2 \rfloor] \bmod T_{SFC} \in \Delta_{SFC}$$

In this case, $n_s$ is a serial number of a time slot. The physical meaning of the formula is that within each radio superframe, the cell-specific SRS subframe is determined from subframe 0 according to the periodicity $T_{SFC}$ and the offset $\Delta_{SFC}$.

TABLE 6

Cell-specific SRS subframe Configuration

| rs-SubframeConfig | Binary | Configuration Periodicity $T_{SFC}$ (subframes) | Transmission offset $\Delta_{sfc}$ (subframes) |
|---|---|---|---|
| 0 | 0000 | 1 | {0} |
| 1 | 0001 | 2 | {0} |
| 2 | 0010 | 2 | {1} |
| 3 | 0011 | 4 | {0} |
| 4 | 0100 | 4 | {1} |
| 5 | 0101 | 4 | {2} |
| 6 | 0110 | 4 | {3} |
| 7 | 0111 | 4 | {0, 1} |
| 8 | 1000 | 4 | {2, 3} |
| 9 | 1001 | 8 | {0} |
| 10 | 1010 | 8 | {1} |
| 11 | 1011 | 8 | {2} |
| 12 | 1100 | 8 | {3} |
| 13 | 1101 | 8 | {0, 1, 2, 3, 4, 6} |

TABLE 6-continued

Cell-specific SRS subframe Configuration

| rs-SubframeConfig | Binary | Configuration Periodicity $T_{SFC}$ (subframes) | Transmission offset $\Delta_{sfc}$ (subframes) |
|---|---|---|---|
| 14 | 1110 | 8 | {0, 1, 2, 3, 4, 6, 7} |
| 15 | 1111 | reserved | reserved |

When $T_{SFC}$ is 4 ms, the value of $\Delta_{SFC}$ may be an integer between 0 and 3. In the uplink/downlink subframe distribution within the downlink-to-uplink switch-point periodicity, subframes corresponding to some values of $\Delta_{SFC}$ are always downlink subframes. When a downlink subframe on the FDD uplink carrier is not allowed to carry an uplink symbol, it is impossible to configure these values of $\Delta_{SFC}$. For example, using the configuration shown in Table 7, it is impossible for a subframe corresponding to $\Delta_{SFC}$ of which the value is 0 to transmit the SRS.

TABLE 7

8 ms Uplink/Downlink Conversion Point Cycle

| uplink-downlink configuration | Downlink-to-uplink switch-point periodicity | subframe number within the downlink-to-uplink switch-point periodicity | | | | | | | |
|---|---|---|---|---|---|---|---|---|---|
| | | 0 | 1 | 2 | 3 | 4 | 5 | 6 | 7 |
| 0 | 8 ms | D | S | U | U | U | U | U | U |
| 1 | 8 ms | D | S | U | U | U | U | U | D |
| 2 | 8 ms | D | S | U | U | U | U | D | D |
| 3 | 8 ms | D | S | U | U | U | D | D | D |
| 4 | 8 ms | D | S | U | U | D | D | D | D |
| 5 | 8 ms | D | S | U | D | D | D | D | D |

At block 402, the terminal performs resource mapping on the uplink subframe according to the determined cell-specific SRS subframe.

A Second Embodiment

The embodiment describes a method for configuring a UE-specific SRS subframe of which the triggering type is 0 when the downlink-to-uplink switch-point periodicity of the FDD uplink carrier is configured in accordance with 8 ms within a serving cell. It is assumed that the SRS is transmitted just on a special subframe and an uplink subframe. The method, for configuring the 8 ms downlink-to-uplink switch-point periodicity is the same as that of the first embodiment.

At block 501, a terminal obtains SRS triggering information and determines an SRS subframe of which the triggering type is 0.

It is assumed that $T_{SRS}$ and $T_{offset}$ respectively are a periodicity and a subframe offset of the UE-specific SRS subframe of which the triggering type is 0. The standard defines values of $T_{SRS}$ and $T_{offset}$. Table 8 illustrates an example, in which an SRS configuration index $I_{SRS}$ is indicated by the higher layer signaling and the UE-specific SRS subframe of which the triggering type is 0 satisfies a following formula:

$$[(40(n_f \bmod 4) + k_{srs} - T_{offset}] \bmod T_{SRS} = 0$$

The physical meaning of this formula is that within each radio superframe, the UE-specific SRS subframe of which the triggering type is 0 is determined from subframe 0 according to the periodicity $T_{SRS}$ and the offset $T_{offset}$. In this case, $n_f$ is a serial number of the radio frame and $k_{srs}$ represents a serial number of a symbol transmitting the SRS in the superframe.

Specifically, the meaning of $k_{srs}$ may be described as follows. Uplink subframes and special subframes in all of uplink/downlink configurations construct a subframe set. SRS symbols in these subframes are numbered in a chronological order and a value of a serial number is $k_{srs}$. In this case, each uplink subframe or special subframe may include one or more than one SRS symbol. The UE and the base station may know the number of the SRS symbols included in each subframe in advance, e.g., the standard defines that an uplink subframe includes one SRS symbol and the base station notifies the UE that a special subframe includes one or two SRS symbols through the higher layer signaling. For example, assuming that the n-th subframe in a radio superframe includes one SRS symbol which is the m-th SRS symbol in the radio superframe, the value of $k_{srs}$ of the SRS symbol in the n-th subframe is m. The n+1-th subframe in the radio superframe includes two SRS symbols, the values of $k_{srs}$ of these two SRS symbols respectively are m+1 and m+2.

Alternatively, the meaning of $k_{srs}$ may be described as follows. All of subframes in a radio superframe are sorted. Each subframe (either an uplink subframe or a downlink subframe) has a subframe index within the radio superframe and $k_{srs}$ is the subframe index within the radio superframe.

Alternatively, the meaning of $k_{srs}$ may be described as follows. Considering that UpPTS may include two SRS symbols, it may be defined that a subframe prior to UpPTS does not include the SRS symbol and $k_{srs}$ is the subframe index within the radio superframe. For example, it may be defined that the subframe prior to UpPTS is a downlink subframe and the downlink subframe does not include the SRS symbol. In another example, the subframe prior to UpPTS is an uplink subframe and the uplink subframe does not include the SRS symbol.

TABLE 8

Cycle $T_{SRS}$ and subframe offset configuration $T_{offset}$ of the UE-specific SRS subframe of which the triggering type is 0

| SRS configuration index $I_{SRS}$ | SRS periodicity $T_{SRS}$ (ms) | SRS subframe offset $T_{offset}$ |
|---|---|---|
| 0-1 | 2 | ISRS |
| 2-5 | 4 | ISRS-2 |
| 6-13 | 8 | ISRS-6 |
| 14-29 | 16 | ISRS-14 |
| 30-69 | 40 | ISRS-30 |
| 70-149 | 80 | ISRS-70 |
| 150-309 | 160 | ISRS-150 |
| 310-629 | 320 | ISRS-310 |
| 630-1023 | reserved | reserved |

At block 502, the terminal transmits the SRS at the determined SRS subframe of which the triggering type is 0.

A Third Embodiment

The embodiment describes a method for configuring a UE-specific SRS subframe of which the triggering type is 1 when the downlink-to-uplink switch-point periodicity of the FDD uplink carrier is configured in accordance with 8 ms in a serving cell. It is assumed that the SRS is transmitted only at a special subframe and an uplink subframe. The method for configuring the 8 ms downlink-to-uplink switch-point periodicity is the same as that described in the first embodiment.

At block 601, a terminal obtains physical layer signaling and higher layer signaling of SRS configuration and triggering information, and determines an SRS subframe of which the triggering type is 1.

According to the descriptions at block 301, the terminal determines w carrier carrying the SRS, and determines whether to transmit the SRS of which the triggering type is 1 according to a bit field indicating the SRS in the physical layer signaling. In addition, the terminal determines to transmit the SRS subframe of which the triggering type is 1 according to the higher layer signaling. It is assumed that $T_{SRS,1}$ and $T_{offset,1}$ respectively are a periodicity and a subframe offset of the UE-specific SRS subframe of which the triggering type is 1. The standard defines values of $T_{SRS,1}$ and $T_{offset,1}$. Table 9 illustrates an example, in which an SRS configuration index $I_{SRS}$ is indicated by the higher layer signaling and the UE-specific SRS subframe of which the triggering type is 1 satisfies a following formula:

$$[(40(n_f \bmod 4) + k_{srs} - T_{offset,1}] \bmod T_{SRS,1} = 0$$

The physical meaning of this formula is that within each radio superframe, the UE-specific SRS subframe of which the triggering type is 1 is determined from subframe 0 according to the periodicity $T_{SRS,1}$ and the offset $T_{offset,1}$. In the formula, $n_f$ is a serial number of the radio frame and the meaning of $k_{srs}$ is the same as that descried in the second embodiment.

TABLE 9

Cycle $T_{SRS,1}$ and subframe offset configuration $T_{offset,1}$ of the UE-specific SRS subframe of which the triggering type is 1

| SRS Configuration Index $I_{SRS}$ | SRS Periodicity $T_{SRS,1}$ (ms) | SRS Subframe Offset $T_{offset,1}$ |
|---|---|---|
| 0-1 | 2 | ISRS |
| 2-5 | 4 | ISRS-2 |
| 6-13 | 8 | ISRS-6 |
| 14-31 | reserved | reserved |

At block 602, the terminal transmits the SRS at the SRS subframe of which the triggering type is 1 based on the result of block 601.

A Fourth Embodiment

The embodiment describes an SRS power control method. In this case, it is assumed that a determined SRS power is an SRS power on a downlink carrier.

At block 701, a terminal obtains information related to SRS power, control and determines an SRS power value.

For a cell c, a UE transmission power of the SRS on subframe i $P_{SRS,c}(i)$ is $P_{SRS,c}(i) = \min \{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$ Among them, $P_{CMAX,c}(i)$, $P_{SRS\_OFFSET,c}(m)$, $M_{SRS,c}$, $P_{O\_PUSCH,c}(j)$ and $\alpha_c(j)$ are determined by definitions in 5.1.3 of 3GPP TS 36.213 v10.2.0. $f_c(i)$ is a power control adjustment value of the serving cell c corresponding to the downlink carrier. The DL Grant scheduling the PUSCH of the FDD downlink carrier includes Transmitter Power Control (TPC) and a UE-specific correction value $\delta_{PUCCH}$ may be obtained according to the TPC. A corresponding relationship between the TPC field in the DL Grant and $\delta_{PUCCH}$ is determined according to Table 5.1.1.1-2 in 5.1.1.1 of 3GPP TS 36.213 v10.2.0. The value of $f_c(i)$ may be obtained according to 5.1.1.1 after $\delta_{PUCCH}$ is obtained. According to the foregoing descriptions, the TPC in the DL Grant is used to indicate the SRS transmission power control adjustment value on the FDD downlink carrier.

When the FDD downlink carrier, the FDD uplink carrier, and another aggregated carrier transmit the SRS simultaneously and a total UE SRS transmission power within a symbol is greater than $\hat{P}_{CMAX}(i)$, the UE weights the serving cell c and an SRS power linear value $\hat{P}_{SRS,c}(i)$ on the symbol of subframe i using w(i), in which the weighted value w(i) meets following constraints including $$\sum_c w(i) \cdot \hat{P}_{SRS,c}(i) \leq \hat{P}_{CMAX}(i)$$

and 0<w(i)≤1. Among them, $\hat{P}_{SRS,c}(i)$ is the linear value of $P_{SRS,c}(i)$, $\hat{P}_{CMAX}(i)$ is a linear value of $P_{CMAX}$ at the subframe i, and $P_{CMAX}$ is defined in 3GPP TS36.101.

at block 702, the terminal transmits the SRS according to the determined SRS power value.

A Fifth Embodiment

The embodiment describes the determination of a carrier used for transmitting the SRS when the SRS triggering is performed according to the triggering type 1.

At block 801, a terminal obtains configuration and triggering information of an SRS of which the triggering type is 1 and determines a carrier used for transmitting the SRS.

Physical layer signaling such as DCI format 0/4/1A and/or DCI format 2B/2C may be physical layer signaling of the SRS of which the triggering type is 1. The carrier used for transmitting the SRS is determined according to a carrier where scheduling data such as DCI format 0/4/1A and/or DCI format 2B/2C is located. That is, a carrier where Physical Uplink Shared Channel (PUSCH)/Physical Downlink Shared Channel (PDSCH) data scheduled by DCI format 0/4/1A and/or DCI format 2B/2C is located is the carrier used for transmitting the SRS.

For example, when the SRS transmission is triggered in DCI format 0/4 and DCI format 0/4 schedules PUSCH transmission of the uplink carrier, the DCI format 0/4 triggers the SRS transmission at the uplink carrier corresponding to the CIF. In another example, when the SRS transmission is triggered in DCI format 0/4 and DCI format 0/4 does not include the CIF and DCI format 0/4 schedules PUSCH transmission of the uplink carrier at the serving cell c, the DCI format 0/4 triggers the SRS transmission of the uplink carrier at the serving cell c. In another example, when the SRS transmission is triggered in DCI format 1A/2B/2C and DCI format 1A/2B/2C includes an CIF and DCI format 1A/2B/2C schedules PDSCH transmission of the uplink carrier, the DCI format 1A/2B/2C triggers the SRS transmission at the uplink carrier corresponding to the CIF. In another example, when the SRS transmission is triggered in DCI format 1A/2B/2C and DCI format 1A/2B/2C does not include the CIF and DCI format 1A/2B/2C schedules PDSCH transmission of the downlink carrier at the serving cell c, the DCI format 1A/2B/2C triggers the SRS transmission of the downlink carrier at the serving cell c.

If the FDD uplink carrier and the FDD downlink carrier belong to the same serving cell and the FDD uplink carrier is flexible duplex, when cross-carrier PDSCH scheduling is supported, the uplink carrier and downlink carrier in the cell and in different cells may be scheduled in DCI format 1A/2B/2C. As such, the PDSCH CIF is formed by 3 bits and indicates a cell serial number. At the same time, a bit is added to the DCI format for indicating whether the SRS (and/or PDSCH) is located at the uplink carrier or the downlink carrier.

At block 802, the terminal transmits the SRS at the determined carrier used for transmitting the SRS.

At block 803, the base station obtains downlink channel information based on the received information such as the uplink SRS.

So far, the present disclosure describes several preferred example embodiments. In practice, one or more embodiments described in the present disclosure may be employed.

Corresponding to the method described above, various example embodiments of the present disclosure also describe a terminal device and a base station device, which are described as follows with reference to the accompanying drawings.

Figure 5:
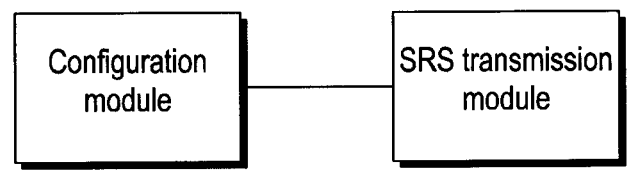
FIG. 5 is a diagram illustrating a structure of a terminal, according to various embodiments of the present disclosure.

FIG. 5 is a diagram illustrating a structure of the terminal, according to various embodiments of the present disclosure. The terminal may include a configuration module and an SRS transmission module.

The configuration module may obtain configuration and triggering information of an SRS, determine a carrier and a subframe where transmission of the SRS is located according to the SRS configuration and triggering information, obtain SRS power control information and determine an SRS power value. In this case, the carrier where the transmission of the SRS is located is an FDD uplink carrier, an FDD downlink carrier, or an uplink carrier of flexible duplex.

The SRS transmission module may transmit the SRS at the determined carrier and subframe with the determined SRS power value for a base station to estimate channel information.

Figure 6:
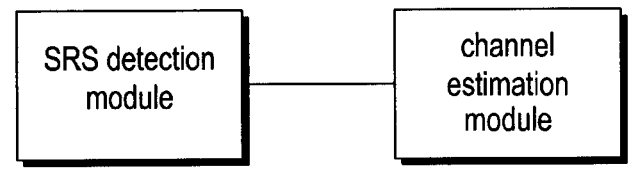
FIG. 6 is a diagram illustrating a structure of a base station, according to various embodiments of the present disclosure.

FIG. 6 is a diagram illustrating a structure of the base station, according to various embodiments of the present disclosure. The base station may include an SRS detection module and a channel estimation module.

The SRS detection module may detect an SRS transmitted by a terminal at a downlink carrier or an uplink carrier of flexible duplex.

The channel estimation module may perform channel estimation according to the SRS detected by the SRS detection module and configure an estimation result as channel information of a downlink channel corresponding to an uplink channel carrying the SRS. According to an embodiment of the present disclosure, the estimation result may be combined with channel information reported by a UE to construct total channel information.

Various embodiments of the present disclosure describe the SRS, transmission on an FDD downlink carrier and an uplink carrier supporting the uplink/downlink transmission. According the embodiments of the present disclosure, the SRS on a corresponding carrier is simply and effectively, configured and transmitted, so that the FDD system has the channel reciprocity and is more suitable for a large-scale multi-antenna system. Various embodiments of the present disclosure describe an SRS transmission method and device when an uplink carrier of the FDD system may transmit an uplink signal and a downlink signal. In addition, the above technical scheme described in various embodiments of the present disclosure makes little changes on existing devices or systems and does not affect compatibility of devices.

The above are example embodiments of the present disclosure, and are not used for limiting the present disclosure. Any modifications, equivalents, improvements, etc., made under the spirit and principle of the present disclosure should be included in the protection scope of the present disclosure.

The invention claimed is:

1. A method for transmitting an uplink sounding reference signal (SRS) at a terminal, comprising:
   obtaining configuration and triggering information of the SRS from a base station;
   determining a carrier and a subframe to transmit the SRS based on the configuration and triggering information, wherein the carrier is determined as one of a frequency division duplex (FDD) downlink carrier and a flexible duplex uplink carrier;
   obtaining power control information and determining a power value based on the obtained power control information; and
   transmitting the SRS to the base station, through the determined carrier and subframe with the determined power value, for estimating channel information based on the SRS and configuring the channel information as downlink channel information on the determined one of the FDD downlink carrier and the flexible duplex uplink carrier,
   wherein determining the carrier comprises:
     determining the flexible duplex uplink carrier is an FDD uplink carrier; and
     determining the carrier from among the FDD downlink carrier and the FDD uplink carrier, as that which carries the configuration and triggering information, in response to the flexible duplex uplink carrier being the FDD uplink carrier.

2. The method of claim 1, wherein obtaining the configuration and triggering information of the SRS from the base station comprises obtaining configuration and triggering information corresponding to each of different serving cells, when the different serving cells are configured based on the FDD uplink carrier and the FDD downlink carrier.

3. The method of claim 1, wherein determining the carrier comprises:
   obtaining a carrier direction indicator for the carrier included in the configuration and triggering information.

4. The method of claim 1, wherein when an SRS transmission is triggered through a triggering type 1, determining the carrier comprises:
   determining the carrier as that which transmits data scheduling by physical layer signaling to trigger the SRS transmission; or
   determining the carrier as that which transmits physical layer signaling to trigger the SRS transmission;
   wherein when first configuration and triggering information of the FDD uplink carrier and second configuration and triggering information of the FDD downlink carrier within a serving cell of the terminal are the same, the determining the carrier and the subframe comprises one of:
     when the FDD uplink carrier supports an uplink transmission, determining the carrier and the subframe in accordance with an FDD mode, and
     when the FDD uplink carrier supports both an uplink transmission and a downlink transmission, determining the carrier and the subframe in accordance with a TDD mode; and
   wherein when the first configuration and triggering information and the second configuration and triggering information are the same, the method further comprises:
     when the terminal does not determine that the FDD uplink carrier supports a downlink transmission, ignoring the obtained configuration and triggering information without performing the SRS transmission; and
   wherein when the first configuration and triggering information and the second configuration and triggering information are different, determining the carrier and the subframe comprises:
     receiving, from the base station, higher layer signaling corresponding to the one of the flexible duplex uplink carrier and the FDD downlink carrier and indicating a configuration and triggering mode; and
     determining the carrier and the subframe in accordance with the configuration and triggering mode;
   wherein the triggering mode indicates a TDD mode or an FDD mode.

5. The method of claim 4, further comprising:
   receiving a higher layer signaling transmitted from the base station, wherein the higher layer signaling includes a subframe indication indicating that the SRS transmission is allowed within a configured periodicity.

6. The method of claim 1, wherein when an FDD uplink carrier of a serving cell of the terminal supports a downlink transmission and the terminal does not determine a subframe for uplink/downlink distribution of the FDD uplink carrier, the method further comprises:
   ignoring, by the terminal, an SRS configuration of which a triggering type is 0 without performing an SRS transmission; or
   according to a downlink hybrid automatic retransmission request (HARD) reference configuration, when a physical uplink shared channel (PUSCH) is not scheduled on a first subframe which is not used as an uplink subframe and uplink pilot time slot (UpPTS), ignoring an SRS configuration of which a triggering type is 0 on the first subframe without performing an SRS transmission.

7. The method of claim 1, wherein obtaining the power control information comprises:
   obtaining a transmit power control (TPC) indication corresponding to the FDD downlink carrier in a first downlink control information (DCI) format; and
   determining a power control adjustment value of the SRS on the FDD downlink carrier based on the TPC indication;
   wherein obtaining the TPC indication comprises:
     determining a TPC serial number of each of an uplink carrier and a downlink carrier according to higher layer signaling, and reading a TPC indication corresponding to the determined TPC serial number of the downlink carrier from the first DCI format; or
     pre-designating a subframe corresponding to a downlink carrier and a subframe corresponding to an uplink carrier, and determining whether a TPC indication in the first DCI format corresponds to the uplink carrier or the downlink carrier according to where the first DCI format is located.

8. The method of claim 1, wherein when the FDD downlink carrier supports a lower version terminal, the method further comprises:
   obtaining the configuration and triggering information indicating that transmitting the SRS was not performed on a subframe transmitting a system information block (SIB), a paging signal, or a multimedia broadcast single frequency network (MBSFN) and/or on a subframe transmitting a semi-persistent scheduling (SPS) signal of the lower version terminal;

wherein the lower version terminal is a terminal which does not support transmitting the SRS on the FDD downlink carrier.

9. A terminal device for transmitting an uplink sounding reference signal (SRS), the terminal comprising:
 a controller configured to obtain configuration and triggering information of the SRS from a base station, determine a carrier and a subframe to transmit the SRS based on the configuration and triggering information, obtain power control information and determine a power value based on the obtained power control information; wherein the carrier is determined as one of a frequency division duplex (FDD) downlink carrier and a flexible duplex uplink carrier; and
 a transceiver configured to transmit the SRS to the base station through the determined carrier and subframe with the determined power value, for estimating channel information based on the SRS and configuring the channel information as downlink channel information on the determined one of the FDD downlink carrier and the flexible duplex uplink carrier,
 wherein, when the flexible duplex uplink carrier is an FDD uplink carrier, the carrier is determined, by the controller, from among the FDD downlink carrier and the FDD uplink carrier, as that which carries the configuration and triggering information.

10. The terminal device of claim 9, wherein when different serving cells are configured based on the FDD uplink carrier and the FDD downlink carrier, the controller is further configured to obtain configuration and triggering information corresponding to each of the different serving cells.

11. The terminal device of claim 9, wherein the controller is configured to obtain a carrier direction indicator for the carrier included in the configuration and triggering information.

12. The terminal device of claim 9, wherein:
when an SRS transmission is triggered through a triggering type 1:
 the controller is configured to determine the carrier as that which transmits data scheduling by physical layer signaling to trigger the SRS transmission; or
 the controller is configured to determine the carrier as that which transmits physical layer signaling to trigger the SRS transmission; and
wherein when first configuration and triggering information of the FDD uplink carrier and second configuration and triggering information of the FDD downlink carrier within a serving cell of the terminal device are the same, the controller is configured to one of:
 when the FDD uplink carrier supports an uplink transmission, determine the carrier and the subframe in accordance with an FDD mode,
 when the FDD uplink carrier supports both an uplink transmission and a downlink transmission, determine the carrier and the subframe in accordance with a TDD mode, and
when the first configuration and triggering information and the second configuration and triggering information are the same, and when the terminal device does not determine that the FDD uplink carrier supports a downlink transmission, the controller is configured to ignore the obtained configuration and triggering information without performing the SRS transmission; and
when the first configuration and triggering information and the second configuration and triggering information are different, the controller is further configured to control the transceiver to receive, from the base station, higher layer signaling corresponding to the one of the flexible duplex uplink carrier and the FDD downlink carrier and indicating a configuration and triggering mode; and the controller is further configured to determine the carrier and the subframe in accordance with the configuration and triggering mode;
the triggering mode indicates a TDD mode or an FDD mode.

13. The terminal device of claim 9, wherein:
when an FDD uplink carrier of a serving cell of the terminal device supports a downlink transmission and the terminal device does not determine a subframe for uplink/downlink distribution of the FDD uplink carrier, the controller is configured to ignore an SRS configuration of which a triggering type is 0 without performing an SRS transmission; or
according to a downlink hybrid automatic retransmission request (HARD) reference configuration, when a physical uplink shared channel (PUSCH) is not scheduled on a first subframe which is not used as an uplink subframe and uplink pilot time slot (UpPTS), the controller is configured to ignore an SRS configuration of which a triggering type is 0 on the first subframe without performing an SRS transmission.

14. The terminal device of claim 9, wherein:
the controller is configured to:
 obtain transmit power control (TPC) indication corresponding to the FDD downlink carrier in a first downlink control information (DCI) format, and
 determine a power control adjustment value of the SRS on the FDD downlink carrier based on the TPC indication, wherein the controller is configured to:
 determine a TPC serial number of each of an uplink carrier and an downlink carrier according to higher layer signaling, and read a TPC indication corresponding to the determined TPC serial number of the downlink carrier from the first DCI format; or
 pre-designate a subframe corresponding to a downlink carrier and a subframe corresponding to an uplink carrier, and determine whether a TPC indication in the first DCI format corresponds to the uplink carrier or the downlink carrier according to where the first DCI format is located.

15. The terminal device of claim 9, wherein:
when the FDD downlink carrier supports a lower version terminal, the controller is further configured to obtain the configuration and triggering information indicating that transmitting the SRS is not performed on a subframe transmitting a system information block (SIB), a paging signal, or a multimedia broadcast single frequency network (MBSFN) and/or on a subframe transmitting a semi-persistent scheduling (SPS) signal of the lower version terminal; and
the lower version terminal is a terminal which does not support transmitting the SRS on the FDD downlink carrier.

16. The terminal device of claim 9, wherein the transceiver is further configured to receive a higher layer signaling from the base station, the higher layer signaling includes a subframe indication indicating that an SRS transmission is allowed within a configured periodicity.

* * * * *